United States Patent [19]
Sakaguchi et al.

[11] 4,215,256
[45] Jul. 29, 1980

[54] GAS-INSULATED SWITCHGEAR APPARATUS

[75] Inventors: Minoru Sakaguchi; Kazuaki Oishi; Seizo Nakano; Tuneo Kishi, all of Hitachi, Japan

[73] Assignee: Hitachi, Ltd., Tokyo, Japan

[21] Appl. No.: 897,058

[22] Filed: Apr. 17, 1978

Related U.S. Application Data

[63] Continuation of Ser. No. 692,337, Jun. 3, 1976.

[30] Foreign Application Priority Data

Jun. 18, 1975 [JP]  Japan .................................. 50-73864

[51] Int. Cl.² ........................................... H01H 33/88
[52] U.S. Cl. ........................... 200/148 D; 200/148 R; 200/148 F
[58] Field of Search ............ 200/148 D, 148 F, 148 R

[56] References Cited
U.S. PATENT DOCUMENTS 3,946,184  3/1976  Yoshioka et al. ............... 200/148 D

FOREIGN PATENT DOCUMENTS 1441239  4/1966  France ................................. 200/148 D Primary Examiner—Robert S. Macon
Attorney, Agent, or Firm—Craig & Antonelli

[57]  ABSTRACT

Gas-insulated switchgear apparatus wherein a device providing a first disconnect gap and a second disconnect gap is located in a sheath filled with an insulating gas and kept at ground potential. The disconnect gaps providing device comprises a first movable contact and a second movable contact which are insulatedly supported by a support device with respect to the sheath. There is provided a device for individually actuating the movable contacts which device comprises a pair of insulated actuating rods disposed adjacent and extending parallel to the insulating support device.

5 Claims, 12 Drawing Figures

GAS-INSULATED SWITCHGEAR APPARATUS

This is a continuation of application Ser. No. 692,337 filed June 3, 1976.

BACKGROUND OF THE INVENTION

This invention relates to gas-insulated switchgear apparatus, and more particularly it is concerned with gas-insulated switchgear apparatus of the type wherein the circuit component elements including the disconnecting switches are combined as a unit in a single system.

Gas-insulated switchgear apparatus generally comprise a disconnect gaps providing device, a grounding device and other electrical devices arranged in the interior of a sheath filled with an insulating gas and kept at ground potential. By using a gas of high insulating capability, e.g. $SF_6$ gas, the gas-insulated switchgear apparatus makes it possible to greatly reduce the area of a site at which a substation is installed as compared with the area of a site at which a substation using switchgear apparatus of the open-air insulation type is installed.

However, gas-insulated switchgear apparatus of the prior art are generally constructed such that a plurality of electrical devices are arranged in successive connection relationship as, for example, two L-shaped or linear disconnecting switches are arranged in face-to-face relation on opposite sides of the feeder line element. This type of structure naturally places limitations on the extent to which the switchgear apparatus can be reduced in size. Meanwhile there has in recent years been a growing demand for further reduction in the size of a gas-insulated switchgear, and in the number of component parts thereof, with a view to reducing cost and increasing reliability in performance.

SUMMARY OF THE INVENTION

Accordingly, an object of this invention is to provide a gas-insulated switchgear apparatus which makes it possible to reduce its size by combining various electrical devices as a unit in a single system.

Another object of the invention is to provide a gas-insulated switchgear apparatus wherein the number of component parts is reduced, thereby reducing cost and increasing reliability in performance.

In accordance with the invention, there is provided a gas-insulated switchgear apparatus comprising a device providing a first disconnect gap and a second disconnect gap in a sheath which is filled with an insulating gas and kept at ground potential, the device comprising a first movable contact and a second movable contact for opening and closing the first disconnect gap and the second disconnect gap respectively. The pair of movable contacts are insulatedly supported by an insulating support device with respect to the sheath, and adapted to be individually actuated by an actuating device. The actuating device comprises a pair of actuating rods made of an insulating material and operatively connected to the pair of movable contacts respectively, the pair of actuating rods being disposed adjacent and extending parallel to the insulating support device. The actuating device further comprises a pair of actuators operatively connected to the pair of actuating rods and arranged at the outside of the sheath for driving or actuating the first and second movable contacts respectively.

The insulating support device preferably comprises a hollow insulating support base made of an insulating material, with the pair of actuating rods extending through the interior of the hollow base.

The device providing the first and second disconnect gaps preferably comprises a conductor slidably housing therein the first and second movable contacts for electrical connection therewith, the conductor being insulatedly supported by the insulating support base with respect to the sheath.

The device providing the first and second disconnect gaps preferably comprises a first fixed contact and a second fixed contact insulatedly supported with respect to the sheath and arranged in face-to-face relationship to the first and second movable contacts respectively.

DETAILED DESCRIPTION OF THE PREFERRED EMBODIMENT

Figure 1:
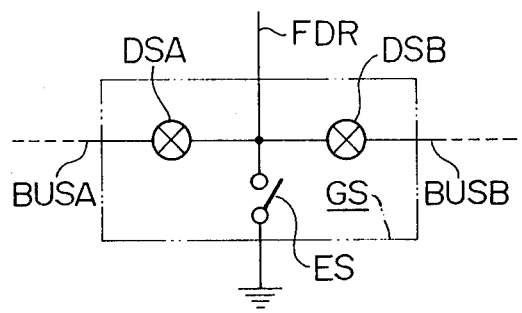
FIG. 1 is a skeleton diagram showing an electric power system to which this invention is applicable.

A preferred embodiment of the present invention will now be described with reference to FIG. 4 and FIG. 5, wherein the gas-insulated switchgear apparatus 10 comprises a sheath 12 filled with an insulating gas and kept at ground potential. Located in the sheath 12 is a device 18 providing a first disconnect gap 14 and a second disconnect gap 16. The disconnect gaps providing device 18 comprises a first movable contact 20 and a second movable contact 22 for opening and closing the first and second disconnect gaps 14 and 16 respectively. The first and second movable contacts 20 and 22 are preferably housed within a conductor 24 which has current collectors 26 and 28 located at opposite ends thereof. Thus, the movable contacts 20 and 22 are slidably supported by the conductor 24 for electrical connection therewith. The disconnect gaps providing device 18 further comprises a first fixed contact 30 and a second fixed contact 32 insulatedly supported in the sheath 12 and disposed adjacent the movable contacts 20 and 22 respectively. Like the conductor 24, the fixed contacts 30 and 32 have current collectors 34 and 36 respectively. When the disconnect gaps 14 and 16 are closed, the movable contacts 20 and 22 have their forward ends received in the fixed contacts 30 and 32 respectively.

The conductor 24 is preferably affixed by fixing means, e.g. bolts, on an insulating support device 38 which may comprise a hollow support base made of an insulating material. The insulating support base 38 is mounted through a mounting fixture 40 on an operating casing 42 by fixing means, e.g. bolts. The operating casing 42 is sealingly attached to the sheath 12 by fixing means, e.g. bolts.

Generally designated by the reference numeral 44 is a device for individually driving or actuating the first and second movable contacts 20 and 22. The actuating device 44 comprises a pair of actuating rods 46 and 48 made of an insulating material and operatively connected to the movable contacts 20 and 22 respectively. Preferably, the insulated actuating rods 46 and 48 are pivotally connected to L-shaped levers 50 and 52 through links 54 and 56 which in turn are pivotally connected to connecting rods 58 and 60 of the movable contacts 20 and 22 respectively. The L-shaped levers 50 and 52 are rotatably supported at their central portions by support members 62 and 64 respectively which are affixed to the conductor 24. The insulated actuating rods 46 and 48 are disposed adjacent the insulating support device 38 and extend substantially parallel thereto. When the device 38 is a hollow support base, the insulated actuating rods 46 and 48 are located therein.

The actuating device 44 further comprises a pair of actuators 66 and 68, disposed outside the sheath 12, which are operatively connected to the insulated actuating rods 46 and 48 for actuating the movable contacts 20 and 22 through the rods 46 and 48 respectively. Preferably, the actuators 66 and 68 actuate operation levers 74 and 76 through rods 70 and 72 respectively, the operation levers 74 and 76 being affixed to shafts 78 and 80 rotatably supported on the operating casing 42. The shafts 78 and 80 are pivotally connected to lower ends of the actuating rods 46 and 48 through arms 82 and 84 respectively. Thus, when the actuators 66 and 68 are rendered operative, the shafts 78 and 80 are rotated through the rods 70 and 72 and cause the actuating rods 46 and 48 to move upwardly to make electrical contact between the movable contacts and fixed contacts by closing the disconnect gaps 14 and 16, and to move downwardly to break electrical contact therebetween to open the disconnect gaps 14 and 16. That is, the operation of the actuators 66 and 68 causes the movable contacts 20 and 22 to be brought into and out of electrical contact with the fixed contacts 30 and 32 through the levers 50 and 52, links 54 and 56 and connecting rods 58 and 60 respectively, thereby making or breaking electrical contact at the disconnect gaps 14 and 16. It is to be understood that the actuators 66 and 68 can be operated individually so as to actuate the movable contacts 20 and 22 individually.

A feeder contact 86 is preferably mounted at the conductor 24, thereby making it possible to connect a feeder conductor 88 to the conductor 24. Likewise, a grounding contact 90 is mounted on the front side of the conductor 24 as seen in FIG. 5 and cooperates with a grounding device 92 attached to the sheath 24 to bring, when necessary, the conductor 24 and the feeder conductor 88 to ground potential.

The reference numeral 94 designates a cover which can be removed when inspection is performed, while the numerals 96 and 98 designate spacers which insulatingly support the fixed contacts 30 and 32 and at the same time separate the apparatus from the adjacent equipment.

Figure 4:
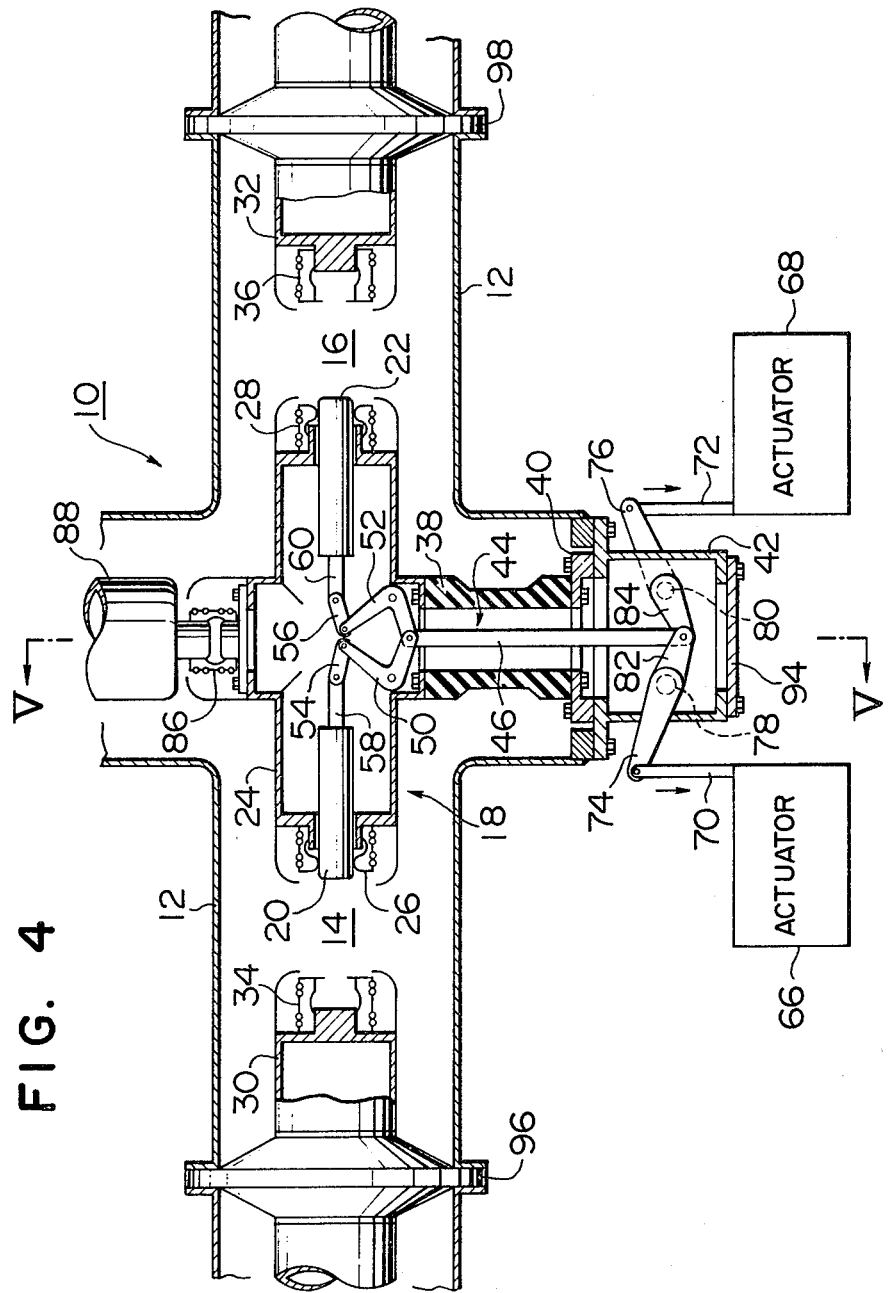
FIG. 4 is a front view, with certain parts being shown in section, of the gas-insulated switchgear apparatus comprising a preferred embodiment of the present invention.
Figure 5:
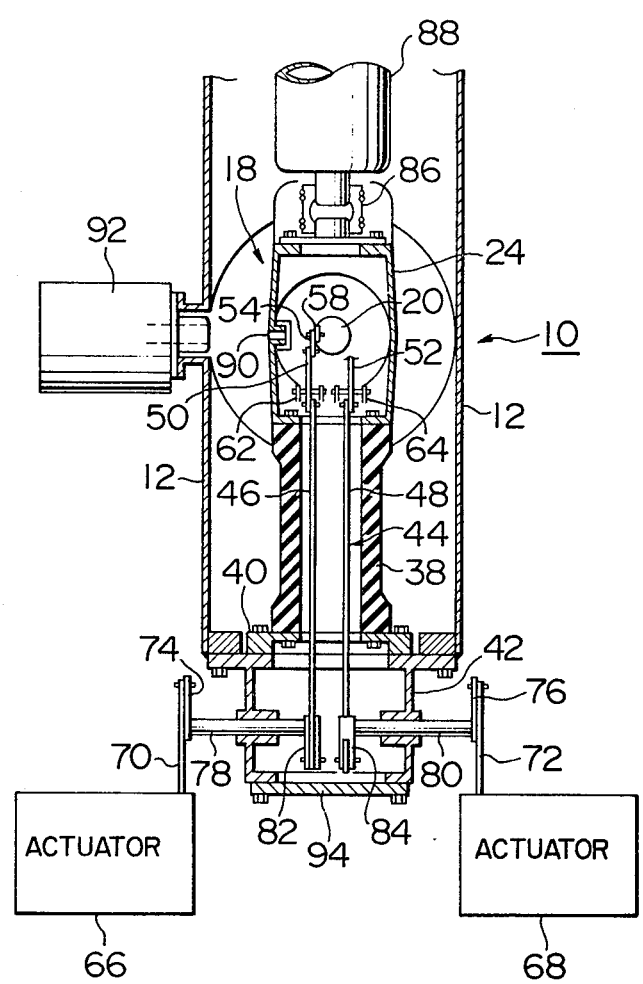
FIG. 5 is a sectional side view of the gas-insulated switchgear apparatus of FIG. 4 taken along the line V—V thereof.

FIG. 1 is a skeleton diagram showing a connection system in which the embodiment of the invention shown in FIG. 4 and FIG. 5 can have application. A skeleton diagram is often used as a connection diagram of an electric power system. As shown, a feeder line FDR branches off between disconnecting switches DSA and DSB connected to double buses BUSA and BUSB respectively. A grounding switch ES is located at the branching point. In the skeleton diagram of FIG. 1, the block GS designated by phantom lines is a portion which corresponds to the gas-insulated switchgear apparatus in accordance with the invention, the disconnecting switches DSA and DSB correspond to the disconnect gaps 14 and 16 in accordance with the invention, the feeder line FDR corresponds to the feeder conductor 88 in accordance with the invention, and the grounding switch ES corresponds to the grounding device 92 in accordance with the invention.

Figure 2:
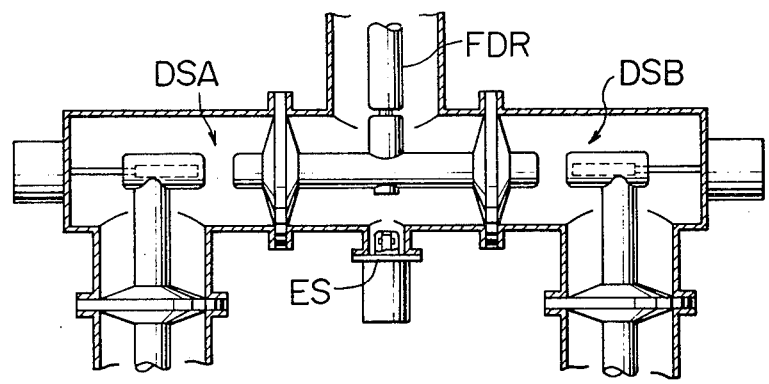
FIG. 2 shows one type of gas-insulated switchgear apparatus of the prior art used for the electric power system shown in FIG. 1.
Figure 3:
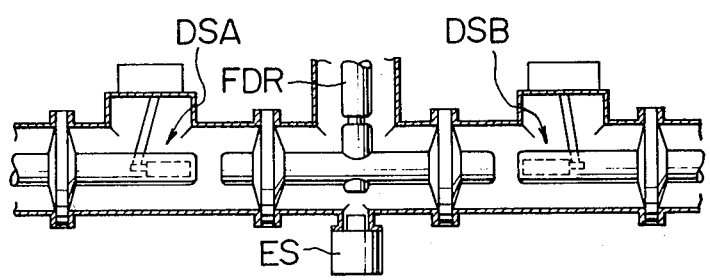
FIG. 3 shows another type of gas-insulated switchgear apparatus of the prior art used for the electric power system shown in FIG. 1.

FIG. 2 and FIG. 3 show the arrangement of gas-insulated switchgear apparatus of the prior art applicable to the skeleton diagram of FIG. 1, in comparison with the gas-insulated switchgear apparatus in accordance with the invention. The apparatus shown in FIG. 2 is of the most commonly used structure wherein the L-shaped disconnecting switches DSA and DSB are located on both sides of the feeder line FDR, while the apparatus shown in FIG. 3 uses linear disconnecting switches DSA and DSB. From these figures, it will be appreciated that the apparatus in accordance with the invention is smaller in size and more compact than the apparatus of the prior art. That is, in the apparatus of the present invention, opening and closing of the disconnect gaps 14 and 16 are effected by actuating the movable contacts 20 and 22 by means of the insulated actuating rods 36 and 38 extending parallel to the single insulating support base. Moreover, the various component parts are combined into a unit in a single system, so that the construction has been very much simplified. The number of parts can thus be reduced and the apparatus has become more reliable in performance than similar apparatus of the prior art.

The examples of application of the gas-insulated switchgear apparatus in accordance with the invention will be described with reference to FIG. 6 to FIG. 12.

Figure 6:
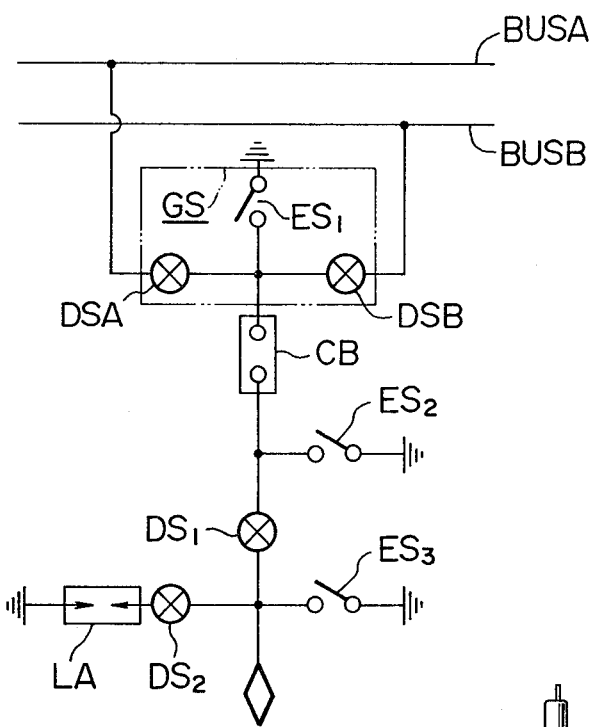
FIG. 6 is a skeleton diagram showing a connection system for a substation to which this invention is applicable.

FIG. 6 is a one-line skeleton diagram showing the double gas system which is the most typical connection system for a substation. In the figure, the apparatus in accordance with the invention can be incorporated in the portion GS comprising disconnecting switches DSA and DSB connected to double buses BUSA and BUSB respectively, and a grounding device $ES_1$ connected to the branch line between the two disconnecting switches.

Figure 7:
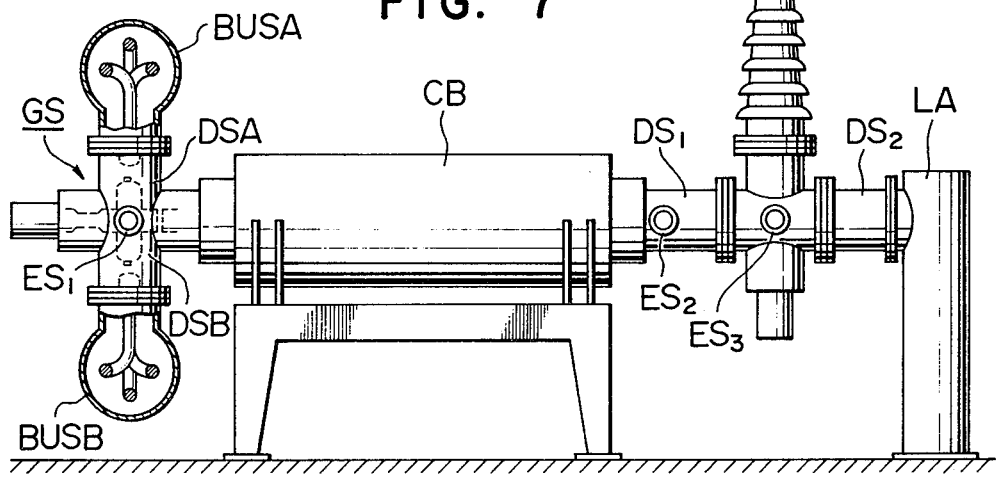
FIG. 7 to FIG. 10 show gas-insulated the switch-gear apparatus in accordance with this invention as incorporated in a substation having the connection system shown in FIG. 5.
Figure 8:
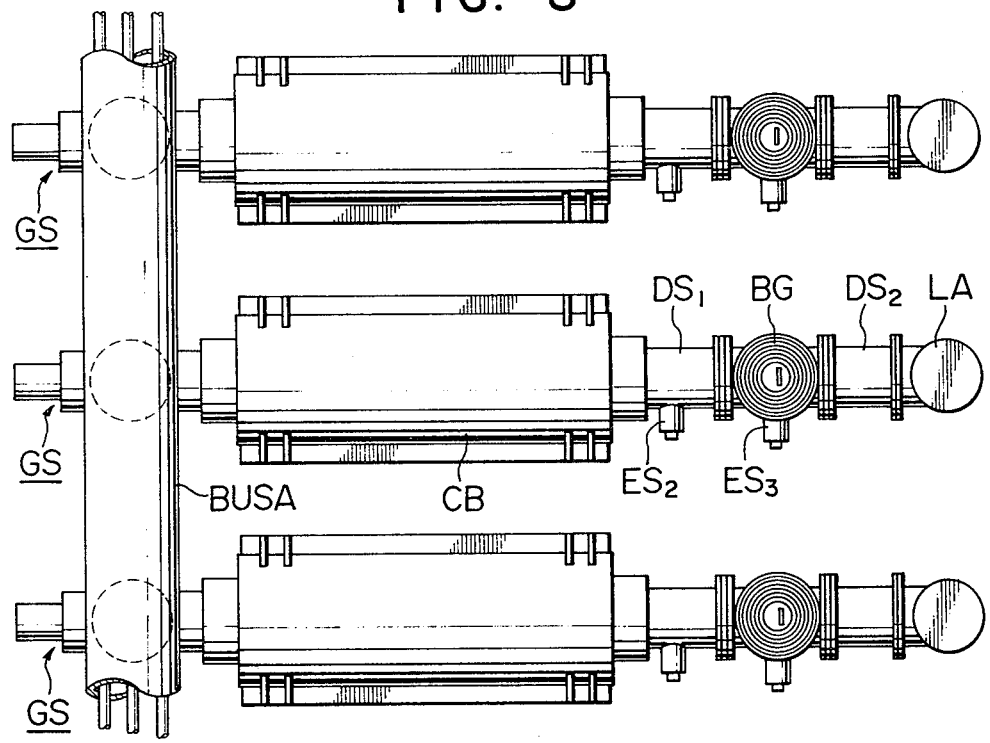
Figure 9:
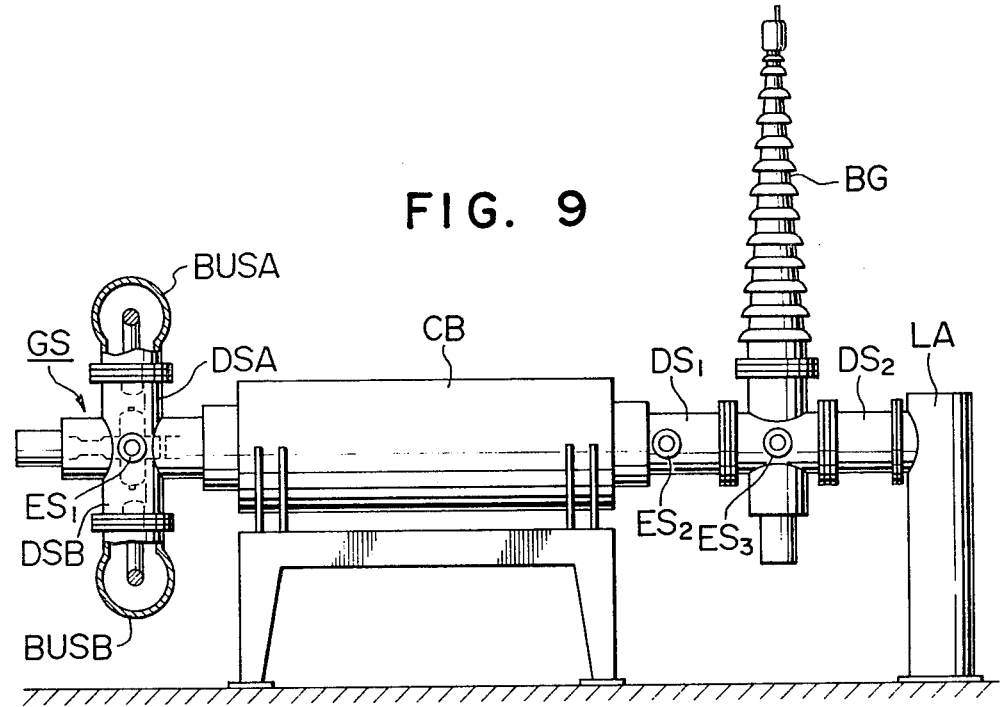
Figure 10:
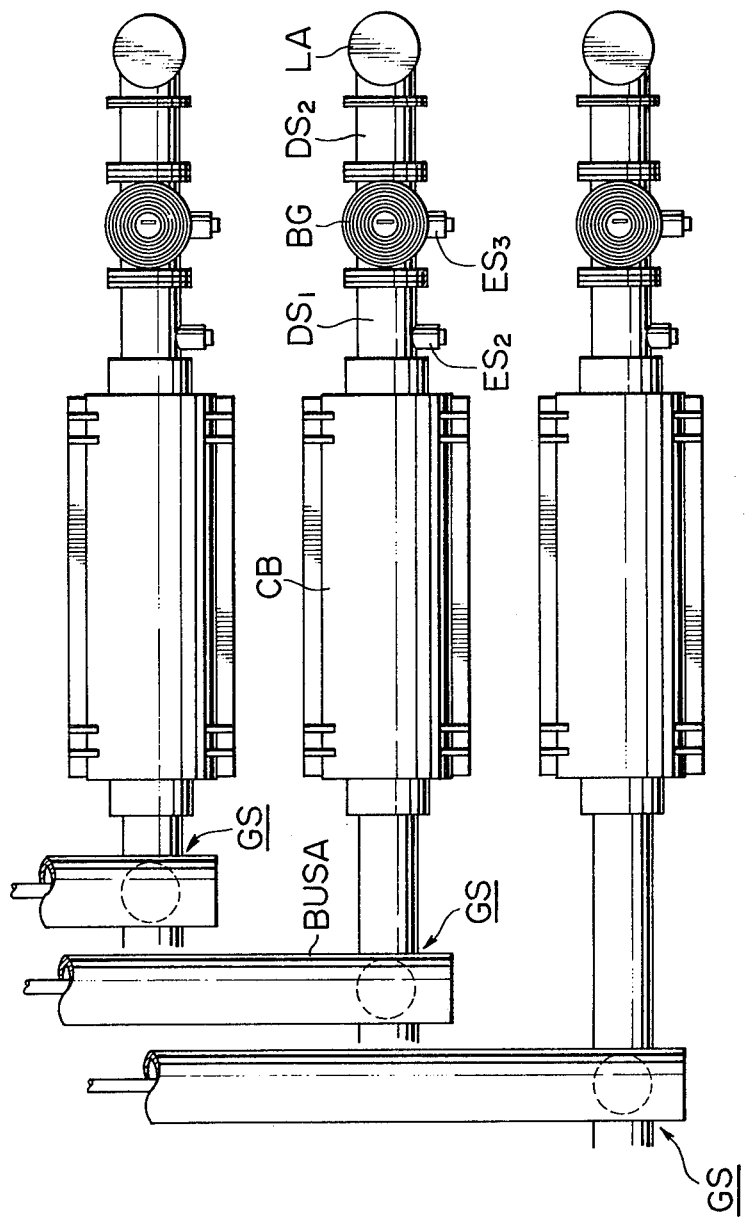

FIG. 7 and FIG. 8 show the structure of the gas-insulated switchgear apparatus GS in accordance with the invention as incorporated in a substation in the form of a threephase-separation bus type. In the figures, CB designates a circuit breaker, $ES_2$ and $ES_3$ further grounding switches, $DS_1$ and $DS_2$ further disconnecting switches, and LA a lightning arrester. From FIG. 7 to FIG. 10, it will be appreciated that the use of the gas-insulated switchgear apparatus in accordance with the invention makes it possible to obtain an overall compact size in a substation, thereby enabling the site at which a substation is installed to be reduced in area.

Figure 11:
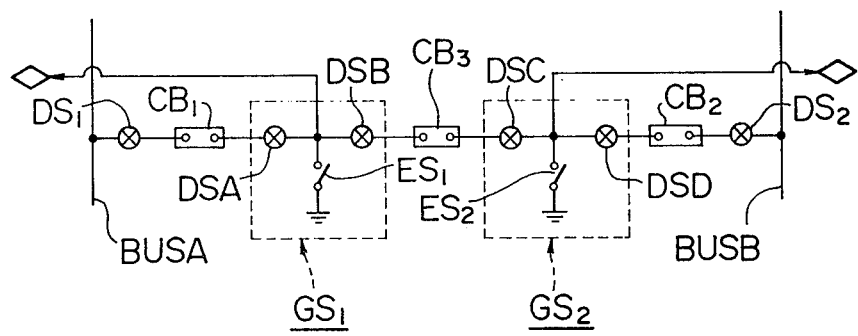
FIG. 11 is a skeleton diagram showing another connection system for a substation to which this invention is applicable.
Figure 12:
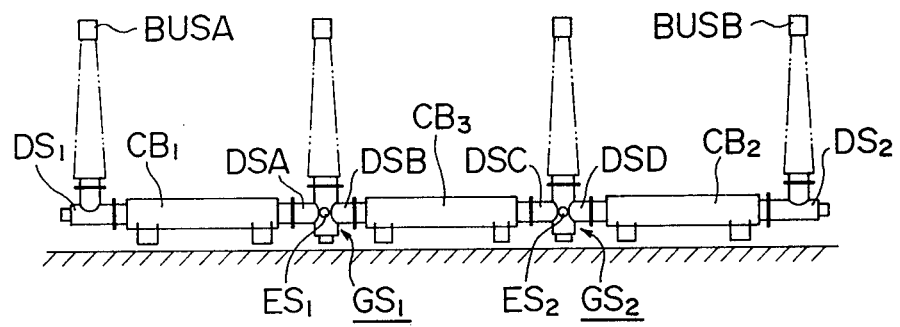
FIG. 12 shows gas-insulated switchgear apparatus in accordance with the invention as incorporated in a substation having the connection system shown in FIG. 11.

FIG. 11 is a skeleton diagram showing a connection system wherein three circuit breakers $CB_1$, $CB_2$ and $CB_3$ are used with double buses BUSA and BUSB in a substation. The apparatus in accordance with the invention can be incorporated in the portion $GS_1$ comprising disconnecting switches DSA and DSB connected to the circuit breakers $CB_1$ and $CB_2$ respectively and a grounding switch $ES_1$ connected to the feeder line between the disconnecting switches, and the portion $GS_2$ comprising disconnecting switches DSC and DSD connected to the circuit breakers $CB_3$ and $CB_2$ respectively and a grounding switch $ES_2$ connected to the feeder line between the disconnecting switches. FIG. 12 shows gas-insulated switchgear apparatus in accordance with the invention as incorporated in the substation shown in a skeleton diagram in FIG. 11. In the figure, $DS_1$ and $DS_2$ are disconnecting switches other than those of the gas-insulated switchgear apparatus in accordance with the invention. From the figure, it will be appreciated that the use of the gas-insulated switchgear apparatus in accordance with the invention makes it possible to arrange in a straight line a system of electrical devices including three circuit breakers. Thus, the electrical devices used in the substation can be arranged logically with no waste of space, thereby making it possible to drastically reduce the area of a site at which the substation is installed.

In the description of the invention set forth hereinabove, reference has been made to an apparatus having the feeder conductor 88. In the absence of the feeder conductor 88, the two disconnect gaps 14 and 16 can be made to open and close simultaneously so that the apparatus can act as a two-point disconnecting switch. By additionally using the grounding contact 90 of the conductor 24 for the grounding device 92, the apparatus can act as a two-point disconnecting switch having a grounding switch. Thus, there is provided a disconnecting switch structure of greater safety.

In the embodiment shown and described herein, the grounding contact 90 for the grounding device 92 is affixed to the conductor 24. It is to be understood, however, that an actuator (not shown) for the grounding device 92 can be mounted in the vicinity of the actuators 66 and 68 for the disconnect gaps. This makes it possible to provide a mechanical interlocking of greater safety between each disconnect gaps and the grounding device, thereby improving reliability of the apparatus in performance.

We claim:

1. Gas-insulated switchgear apparatus comprising:
   a. a sheath filled with an insulating gas and kept at ground potential;
   b. a device located in said sheath and providing a first disconnect gap and a second disconnect gap, said device comprising a first movable contact and a second movable contact adapted to open and close said first disconnect gap and said second disconnect gap respectively, a hollow conductor slidably housing said first and second movable contacts and electrically connecting said first movable contact to said second movable contact, said hollow conductor being provided with a feeder contact thereon;
   c. a feeder conductor located in said sheath and electrically connected to said hollow conductor through said feeder contact;
   d. a device insulatingly supporting said hollow conductor with respect to said sheath; and
   e. a device for individually actuating said first movable contact and said second movable contact, said device comprising a pair of actuating rods made of an insulating material and operatively connected through respective link mechanisms to said first movable contact and said second movable contact respectively, and a pair of actuators, each actuator operatively connected to a respective one of said pair of actuating rods for individually and independently actuating said first movable contact and said second movable contact through the medium of said pair of actuating rods respectively, said pair of actuating rods disposed adjacent and extending parallel to said insulating support device, said link mechanisms being housed in said hollow conductor, and said actuators being located outside said sheath.

2. Gas-insulated switchgear apparatus as claimed in claim 1, wherein said insulating support device comprises a hollow support base made of an insulating material, so that said pair of actuating rods extend through the interior of said hollow support base.

3. Gas-insulated switchgear apparatus as claimed in claim 2, wherein said device providing said first disconnect gap and said second disconnect gap further comprises a first fixed contact and a second fixed contact insulatedly supported by said sheath and disposed adjacent said first movable contact and said second movable contact respectively.

4. Gas-insulated switchgear apparatus as claimed in claim 1, wherein said hollow conductor includes a central portion with a substantially rectangular cross section and a pair of cylindrical arm portions projecting from said central portion, said link mechanisms being housed in the vicinity of said central portion of said hollow conductor, said feeder contact being provided on an upper wall of said central portion and a grounding contact being provided on one side of said central portion, and a grounding device mounted on said sheath and adapted to contact said grounding contact so as to bring said feeder conductor to ground potential when desired.

5. In a gas-insulated switchgear apparatus comprising a sheath filled with an insulating gas and kept at ground potential and at least two movable contacts located in said sheath for providing disconnect gaps respectively, said movable contacts being actuated individually and independently from each other by respective actuators located outside said sheath to open and close said disconnect gaps respectively, wherein the improvement comprises a hollow conductor slidably housing said first and second movable contacts and electrically connecting said first movable contact to said second movable contact, said hollow conductor being provided with a feeder contact thereon, a feeder conductor located in said sheath and electrically connected to said hollow conductor through said feeder contact, a single means for insulatingly supporting said hollow conductor with respect to said sheath, and a pair of actuating rods of an insulating material extending parallel to each other and operatively connected at one end thereof through respective link mechanisms to said respective movable contacts and at the other end to said respective actuators, said pair of actuating rods being disposed adjacent and extending parallel to said supporting means, and said link mechanisms being housed in said hollow conductor, whereby the movable contacts and respective actuating rods are arranged for providing a compact construction of the gas-insulated switchgear apparatus.

* * * * *